United States Patent [19]

Wise et al.

[11] 3,849,290

[45] Nov. 19, 1974

[54] UPGRADING OF REFORMATES BY CATALYST COMPOSITIONS SELECTIVE FOR CRACKING LOW AND HIGH BOILING PARAFFIN COMPONENTS

[75] Inventors: John J. Wise, Media; Samuuel D. Burd, Jr., Yardley, both of Pa.

[73] Assignee: Mobil Oil Corporation, New York, N.Y.

[22] Filed: Aug. 2, 1972

[21] Appl. No.: 277,201

[52] U.S. Cl. .................. 208/66, 208/68, 208/74, 208/59
[51] Int. Cl. ............................................ C10g 37/10
[58] Field of Search ............. 208/62, 66, 68, 72, 74, 208/59

[56] References Cited
UNITED STATES PATENTS

| | | | |
|---|---|---|---|
| 2,573,149 | 10/1951 | Kassel | 208/66 |
| 3,192,150 | 6/1965 | Taylor et al. | 208/62 |
| 3,385,781 | 5/1968 | Hamner et al. | 208/59 |
| 3,395,094 | 7/1968 | Weisz | 208/62 |
| 3,625,880 | 12/1971 | Hamner et al. | 208/62 |
| 3,714,022 | 1/1973 | Stine | 208/62 |

Primary Examiner—Delbert E. Gantz
Assistant Examiner—James W. Hellwege
Attorney, Agent, or Firm—Andrew L. Gaboriault; Carl D. Farnsworth

[57] ABSTRACT

A combination process is described for the upgrading of reformates by sequentially selectively cracking high and low boiling paraffin components using ZSM-5 type and erionite crystalline aluminosilicate catalysts respectively.

8 Claims, 3 Drawing Figures

UPGRADING OF REFORMATES BY CATALYST COMPOSITIONS SELECTIVE FOR CRACKING LOW AND HIGH BOILING PARAFFIN COMPONENTS

BACKGROUND OF THE INVENTION

The art of reforming naphtha hydrocarbons boiling in the gasoline boiling range has been practiced in one form or another for many years. The reforming process has developed to include regenerative and semiregenerative operations. In these operations the total naphtha charge or fraction thereof is passed sequentially through a plurality of separate catalyst beds which may include a parallel sequence of catalyst beds for effecting split feed reforming of the naphtha charge. The catalyst beds are maintained under temperature and pressure conditions which are effective for dehydrogenating naphthenes, cyclizing paraffins, isomerizing hydrocarbons in the charge and hydrocracking. However, the reforming operations of the past have certain built in limits because of reaction kinetics, catalysts available and equipment in which to perform the reforming reactions.

However, with the need to improve products of reforming in composition and octane rating, a renewed interest has been generated with respect to this processing technology. Of particular interest is the need to improve front end performance of the reformate product. The treatment of a reformate with crystalline zeolites to effect physical or chemical treatment of the reformate has been practiced. In these treatments, the zeolites would be preferably small pore crystalline zeolite's which would selectively remove normal paraffins and leave aromatics along with branched paraffins in the reformate.

U.S. Pat. Nos. 2,851,970 and 2,886,508 relate to reforming operations where the reformate or a portion thereof is brought in contact with a 5 Angstrom pore size aluminosilicate in order to selectively remove the n-paraffins. U.S. Pat. No. 3,114,696 relies upon a size selective crystalline zeolite to selectively crack out n-paraffins. U.S. Pat. No. 3,395,094, on the other hand, selectively cracks n-paraffins remaining in a reformate with a particular size selective catalyst under conditions to preserve aromatics and hydrogenate products of cracking.

The present invention is concerned with a still further improvement over the above identified patents by relying upon catalyst compositions having rather unusual reaction selectively for converting low octane components to leave substantially undisturbed sufficiently high octane hydrocarbons found in a reformate product. More particularly, the present invention is concerned with employing a particular sequence of catalyst compositions which will be particularly effective in promoting the reaction chemistry necessary to upgrade naphtha compositions to much higher octane gasoline boiling range product, and in particular to a higher front and octane rating and higher volatility (e.g., lower 50 percent Pt on ASTM distillation).

SUMMARY OF THE INVENTION

This invention is concerned with upgrading a naphtha boiling hydrocarbon fraction to increase its aromaticity, volatility and both its front end and its overall octane rating. In a more particular aspect, the present invention is concerned with improving the octane rating of gasoline boiling range hydrocarbons by a combination of processing conditions relying upon different catalytic compositions particularly selective for effecting one or more reactions of hydrogenation, dehydrogenation, isomerization, cyclization and selective cracking operations which will crack out high molecular weight single branched and normal hydrocarbons in combination with a cracking operation selective for cracking out low molecular weight normal paraffins to thereby improve the front end octane rating of the product thereof.

In accordance with the present invention, a full boiling range gasoline fraction comprising $C_5$ and at least $C_6$ and higher boiling paraffins, naphthenes and aromatics is processed in a sequence of catalytic steps which accomplish dehydrogenation of naphthenes, isomerization, cyclization of hydrocarbon constituents and a particular selective cracking in a hydrogen atmosphere of paraffins remaining in the reformate. Thus, in a more particular aspect, the method of this invention comprises contacting a full boiling naphtha charge and boiling in the gasoline boiling range with a platinum reforming catalyst under conditions selected to particularly effect dehydrogenation of naphthenes, cyclization and isomerization of hydrocarbon constituents existing in the naphtha charge. In this sequence of reactions, platinum-type reforming catalyst conditions are normally employed. That is, the operating pressure will be maintained selected from within the range of from about 50 psig up to about 700 psig using temperatures selected from within the range of 800°F. up to about 1,000°F. Generally the pressure is maintained below 500 psig and the temperature is above about 900°F. Subsequent to effecting the above defined reactions, and particularly dehydrogenation of naphthenes in the naphtha charge, the effluent produced by the reforming operation above defined and known as a reformate is then passed in contact with an intermediate pore size zeolite generally greater than about 6 A and less than about 9 Angstrom pore size crystalline aluminosilicate of a particularly ordered structure as hereinafter defined having activity particularly selective for cracking substantially only high molecular weight normal and singly branched paraffins without cracking double branched paraffins existing in a reformer effluent. Thereafter low boiling paraffins such as normal $C_5$ and $C_6$ hydrocarbons are removed selectively from the high octane reformate by selective cracking in the presence of a small pore zeolite of the erionite variety less than about 6 Angstrom average pore size under hydrogenating conditions. Thus in the combination of this invention following the catalytic reforming step, a selective removal of high boiling low octane normal and single branched paraffins and low boiling low octane normal paraffins is accomplished most effeciently by judicious selection of reaction rates and zeolite catalyst type which will selectively crack under hydrogenating conditions as above described to improve volatility, front end and overall octane rating.

It may be preferred for reasons of economy to limit the platinum catalyst reforming operation to essentially two separate and sequentially arranged beds of catalyst. This does not mean to say, however, that more than two catalyst beds may not be employed. For example, three or more beds of platinum type reforming catalyst may be employed in sequential arrangement. The platinum catalyst reforming reaction zones are provided with preheat facilities before each reaction zone for preheating the charge comprising naphtha alone or in combination with hydrogen passed to each reaction zone. The reformer effluent or reformate comprising aromatics and paraffins obtained by the reforming operation above briefly defined is thereafter passed, either before or after separation of hydrogen-rich gases therefrom, in contact with a crystalline aluminosilicate catalyst of the ZSM-5 type more fully defined below having activity particularly selective for cracking under relatively mild hydrocracking conditions the higher molecular weight normal and single branched paraffin hydrocarbons in the reformate, particularly the normal and single branched paraffins boiling in the $C_7$ and higher boiling range hydrocarbons and leaving behind the more refractory paraffins comprising $n-C_6$ and lower boiling paraffins.

In the processing combination above defined, the total effluent of the platinum catalyst reforming operation may be cooled to a lower temperature but preferably for the large pore, greater than 6 Angstroms (CAS) crystalline aluminosilicate of the ZSM-5 type selective conversion reactions, the temperature should be at least 600°F. The pressure employed during use of this large pore ZSM-5 type of catalyst may conform to reforming pressure conditions, however, higher pressures and in the range of 200 psig up to about 1000 psig may be employed. The product effluent obtained by contacting the reformate with the ZSM-5 type of catalyst may thereafter be separated under elevated pressure conditions to recover a hydrogen rich gaseous stream suitable for recycle to the reforming step separately from a product stream comprising predominantly the higher boiling hydrocarbons. It is to be understood, however, that because of the ZSM-5 type cracking reactions, the hydrogen rich gas stream will contain some low boiling hydrocarbons and the liquid stream will contain some absorbed lower boiling hydrocarbons such as $C_4$ material. It has also been found that the hydrogen purity of the dry gas separated after treatment with the ZSM-5 type of catalyst is generally higher than that obtained by reforming to the same octane. The separated hydrogen rich gaseous stream thus may be recycled all or in part directly to the initial reactor of the reforming operation or a portion thereof may be recycled to the ZSM-5 selective cracking operation. The remaining product effluent comprising primarily $C_5$ and higher boiling reformate product hydrocarbons is thereafter subjected to a further selective cracking operation using a small pore, less than 6 Angstroms crystalline aluminosilicate and comprising an erionite type of hydrocracking catalyst oeration. In this small pore erionite type of catalyst selective hydrocracking operation, primarily low boiling normal paraffins are converted to LPG product material thereby leaving singly branched paraffins of relatively high octane in the reformate product. These singly branched components are desirable for front end volatility and octane rating. Thus, the $C_6-$ normal paraffin removal catalyst operation may be one of hydrocracking or a catalytic cracking operation may be relied upon wherein the pore size of the catalyst and/or operating conditions are particularly limited to make the selective conversion desired. In the selective removal of $C_6-$ and lower boiling n-paraffins from the more complex and diverse molecular reformate structures comprising aromatics, single and multi-branched hydrocarbons by a size selective catalyst operation, the more complex molecular structures are excluded because of pore size from coming in contact with at least the cracking sites of the catalyst. On the other hand, equilibrium temperature and pressure conditions may be selected which will avoid hydrogenating aromatics as well as cracking multi branched hydrocarbons using other selective cracking catalyst compositions suitable for this purpose.

The selective catalyst operation relied upon for converting n-paraffins in preference to single, branched and aromatic structures or the more complex structures in the reformate effluent may be effected at cracking and/or hydrocracking pressure conditions employing temperatures selected from within the range of about 600°F. up to about 1100°F. The product effluent obtained is thereafter passed through one or more separating steps including fractionation to separate the undesired hydrocarbon components from hydrocarbons of desired octane rating. In the event that the selective catalyst operations relied upon in the combination of this invention are effected under hydrocracking temperature and pressure conditions, provisions are made for heating the hydrocarbon product obtained from each operation to a desired elevated temperature in addition to raising the pressure to hydrocracking pressure condition. The product effluent of the respective selective catalyst operations is separated to recover hydrogen containing gaseous material separately from desired higher boiling product.

The processing concepts of the present invention may be practiced in several different arrangements or sequence of processing steps such as those represented in the drawings and hereinafter more specifically discussed. That is, the hydrocarbon reactant stream may pass sequentially through the series of catalyst reaction zones containing the particular catalyst compositions herein defined without separation of hydrogen rich gases between catalyst contact steps. On the other hand, separation of hydrogen rich gases from the reformate before contact with the ZSM-5 catalyst may be practiced or the separation of hydrogen rich gases may not need take place until after treatment with the ZSM-5 type of catalyst has been completed. On the other hand, when selective hydrocracking is relied upon with large and small pore crystalline zeolites, a source of hydrogen must be available for these hydrogen consuming reactions.

The reforming catalyst employed in the processing combination of this invention comprises a platinum type reforming catalyst in which a noble metal such as platinum, palladium or rhodium and combinations thereof is supported by an alumina base which may be either an eta, gamma or mixed eta-gamma alumina. The reforming catalyst may be used alone or in combination with one or more promoters including halogen, such as chlorine or fluorine or a metal promoter known in the art may also be employed therewith. For example, the reforming catalyst may be a bimetallic reforming catalyst comprising a metal halide complex known and described in the prior art. It is also contemplated, however, employing different reforming catalyst compositions in the separate reforming catalyst beds which will be most effective for carrying out one or more of the several catalytic reactions comprising particularly naphthene dehydrogenation, paraffin cyclization and isomerizing reforming reactions as herein discussed.

The ZSM-5 type of conversion catalyst particularly suitable for use in the processing combination of this invention comprises a crystalline aluminosilicate zeolite with novel and unusual catalytic properties. That is, the catalytic operation effected in the presence of a ZSM-5 type of catalyst is particularly effective for high boiling normal paraffin components boiling above $C_6$ hydrocarbons.

The ZSM-5 type catalysts used in the novel process combination of this invention will convert normal aliphatic compounds and singly branched aliphatic compounds, particularly monomethyl substituted compounds, yet substantially not convert all compounds containing at least a quaternary carbon atom or having a molecular dimension equal to or substantially greater than a quaternary carbon atom.

While not wishing to be bound by any theory of operation, nevertheless, it appears that the large pore crystalline zeolitic materials of the ZSM-5 type employed in the instant invention cannot be characterized alone merely by the recitation of a pore size or a range of pore sizes since it is also known to have a relatively high silica to alumina ratio generally above 30 and often in excess of 60 to 1. It appears also that the pore openings of these ZSM-5 type zeolites are not approximately circular in nature, as is more usually the case in many heretofore employed zeolites, but are more appropriately considered as approximately uniformly elliptical in nature. Thus, the pore openings of the ZSM-5 type of zeolitic material have both a major and a minor axes, and the unusual and novel molecular sieving effects appear to be achieved by this elliptical shape. It appears further that the minor axis of the elliptical pores in the zeolites apparently have an effective size of about 5.5 Angstrom units. The major axis appears to be somewhere between 6 and about 9 Angstrom units. The unique molecular sieving action of these materials is presumably due to the presence of these approximately elliptically shaped windows controlling access to the internal crystalline pore structure. In any event, irrespective of a particular molecular dimension or of the pore sizes of the ZSM-5 type catalyst the simple fact remains that outstanding results have been obtained when a hydrocarbon mixture of normal, monomethyl paraffins and aromatics such as provided in a full boiling reformate is converted over a ZSM-5 type catalyst.

When the ZSM-5 type of catalyst is employed downstream of a full boiling range naphtha reforming step, as provided in the present invention, it is apparent that dealkylation-alkylation reaction, although going on to some extent, do not make any significant difference in yields of alkyl aromatics.

Examples of zeolitic materials or crystalline zeolites which have been found operable as hereindefined are a product of thermal treatment of ZSM-5 type catalyst compositions disclosed and claimed in copending application Ser. No. 865,472 filed Oct. 10, 1969 now U.S. Pat. No. 3,702,886 issued Nov. 14, 1972 as well as ZSM-8 crystalline zeolite compositions disclosed and claimed in copending application Ser. No. 865,418 filed Oct. 10, 1969 and abandoned June 20, 1972. The family of ZSM-5 catalyst compositions has the characteristic X-ray diffraction pattern set forth in Table 1, hereinbelow. ZSM-5 compositions can also be identified, in terms of mole ratios of oxides (water-free) as follows:

$$0.9 \pm 0.2\ M_2O : Al_2O_3 : x\ SiO_2$$

wherein M is a cation, $n$ is the valence of said cation, and $x$ is greater than 5.

Members of the family of ZSM-5 zeolites possess a definite distinguishing crystalline structure whose X-ray diffraction pattern shows the following significant lines:

TABLE 1

| Interplanar Spacing d(A) | Relative Intensity |
|---|---|
| 11.1 ± 0.2 | S |
| 10.0 ± 0.2 | S |
| 7.4 ± 0.15 | W |
| 7.1 ± 0.15 | W |
| 6.3 ± 0.1 | W |
| 6.04 ± 0.1 | W |
| 5.97 ± 0.1 | W |
| 5.56 ± 0.1 | W |
| 5.01 ± 0.1 | W |
| 4.60 ± 0.08 | W |
| 4.25 ± 0.08 | W |
| 3.85 ± 0.07 | VS |
| 3.71 ± 0.05 | S |
| 3.64 ± 0.05 | M |
| 3.04 ± 0.03 | W |
| 2.99 ± 0.02 | W |
| 2.94 ± 0.02 | W |

These values as well as all other X-ray data were determined by standard techniques. The radiation was the K-alpha doublet of copper, and a scintiallation counter spectrometer with a strip chart pen recorder was used. The peak heights, I, and the positions as a function of 2 times theta, where theta is the Bragg angle, were read from the spectrometer chart. From these the relative intensities, 100 I/I, where I is the intensity of the strongest line or peak, and $d$ (obs.), the interplanar spacing in A, corresponding to the recorded lines, were calculated. In Table 1 the relative intensities are given in terms of the symbols S = strong, M = medium, MS = medium strong, MW = medium weak and VS = very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-Ray Diffraction
ZSM-5 Powder in Cation Exchanged Forms
d Spacings Observed

| As Made | HCl | NaCl | CaCl$_2$ | ReCl$_3$ | AgNO$_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| — | — | 9.01 | 9.02 | — | 8.99 |
| 8.06 | — | — | — | — | — |
| 7.44 | 7.46 | 7.46 | 7.46 | 7.40 | 7.46 |
| 7.08 | 7.07 | 7.09 | 7.11 | — | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |

TABLE 2-Continued

X-Ray Diffraction
ZSM-5 Powder in Cation Exchanged Forms
d Spacings Observed

| As Made | HCl | NaCl | CaCl$_2$ | ReCl$_3$ | AgNO$_3$ |
|---|---|---|---|---|---|
| 5.56 | 5.58 | 5.58 | 5.57 | 5.59 | 5.58 |
| 5.37 | — | 5.38 | 5.37 | 5.38 | 5.37 |
| 5.13 | 5.11 | 5.14 | 5.12 | 5.14 | — |
| 4.99 | 5.01 | 5.01 | 5.01 | 5.01 | 5.01 |
| — | — | 4.74 | — | — | — |
| 4.61 | 4.62 | 4.62 | 4.61 | 4.63 | 4.62 |
| — | — | 4.46 | 4.46 | — | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | — | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| — | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | — | — | 3.17 | 3.18 | — |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| — | — | — | — | 2.97 | — |
| — | 2.95 | 2.95 | 2.94 | 2.95 | 2.95 |
| 2.85 | 2.87 | 2.87 | 2.87 | 2.87 | 2.87 |
| 2.80 | — | — | — | — | — |
| 2.78 | — | — | 2.78 | — | 2.78 |
| 2.73 | 2.74 | 2.74 | 2.73 | 2.74 | 2.74 |
| 2.67 | — | — | 2.68 | — | — |
| 2.66 | — | — | 2.65 | — | — |
| 2.60 | 2.61 | 2.61 | 2.61 | 2.61 | 2.61 |
| — | 2.59 | — | 2.59 | — | — |
| 2.57 | — | 2.57 | 2.56 | — | 2.57 |
| 2.50 | 2.52 | 2.52 | 2.52 | 2.52 | — |
| 2.49 | 2.49 | 2.49 | 2.49 | 2.49 | 2.49 |
| — | — | — | 2.45 | — | — |
| 2.41 | 2.42 | 2.42 | 2.42 | 2.42 | — |
| 2.39 | 2.40 | 2.40 | 2.39 | 2.40 | 2.40 |
| — | — | — | 2.38 | 2.35 | 2.38 |
| — | 2.33 | — | 2.33 | 2.32 | 2.33 |
| — | 2.30 | — | — | — | — |
| — | 2.24 | 2.23 | 2.23 | — | — |
| — | 2.20 | 2.21 | 2.20 | 2.30 | — |
| — | 2.18 | 2.18 | — | — | — |
| — | — | 2.17 | 2.17 | — | — |
| — | 2.13 | — | 2.13 | — | — |
| — | 2.11 | 2.11 | — | 2.11 | — |
| — | — | — | 2.10 | 2.10 | — |
| — | 2.08 | 2.08 | — | 2.08 | 2.08 |
| — | — | 2.07 | 2.07 | — | — |
| — | — | — | 2.04 | — | — |
| 2.01 | 2.01 | 2.01 | 2.01 | 2.01 | 2.01 |
| 1.99 | 2.00 | 1.99 | 1.99 | 1.99 | 1.99 |
| — | — | — | 1.97 | 1.96 | — |
| 1.95 | 1.95 | 1.95 | 1.95 | 1.95 | — |
| — | — | — | — | 1.94 | — |
| — | 1.92 | 1.92 | 1.92 | 1.92 | 1.92 |
| 1.91 | — | — | — | 1.91 | — |
| — | — | — | — | 1.88 | — |
| 1.87 | 1.87 | 1.87 | 1.87 | 1.87 | 1.87 |
| — | 1.86 | — | — | — | — |
| 1.84 | 1.84 | — | — | 1.84 | 1.84 |
| 1.83 | 1.83 | 1.83 | 1.83 | 1.83 | — |
| 1.82 | — | 1.81 | — | 1.82 | — |
| 1.77 | 1.77 | 1.79 | 1.78 | — | 1.77 |
| 1.76 | 1.76 | 1.76 | 1.76 | 1.76 | 1.76 |
| — | — | 1.75 | — | — | 1.75 |
| — | 1.74 | 1.74 | 1.73 | — | — |
| 1.71 | 1.72 | 1.72 | 1.71 | — | 1.70 |
| 1.67 | 1.67 | 1.67 | — | 1.67 | 1.67 |
| 1.66 | 1.66 | — | 1.66 | 1.66 | 1.66 |
| — | — | 1.65 | 1.65 | — | — |
| — | — | 1.64 | 1.64 | — | — |
| — | 1.63 | 1.63 | 1.63 | 1.63 | 1.62 |
| — | 1.61 | 1.61 | 1.61 | — | 1.61 |
| 1.58 | — | — | — | — | — |
| — | 1.57 | 1.57 | — | 1.57 | 1.57 |
| — | — | 1.56 | 1.56 | 1.56 | — |

Zeolite ZSM-5 can be suitably prepared by preparing a solution containing tetrapropyl ammonium hydroxide, sodium oxide, an oxide of aluminum or gallium, an oxide of silica and water and having a composition, in terms of mole ratios of oxides, falling within the following ranges:

TABLE 3

| Broad | Preferred | Particularly Preferred |
|---|---|---|
| OH$^-$/SiO$_2$ | 0.07–1.0 | 0.1–0.8 | 0.2–0.75 |
| R$_4$N+/(R$_4$N$^+$ +Na$^+$) | 0.2–0.95 | 0.3–0.9 | 0.4–0.9 |
| H$_2$O/OH$^-$ | 10–300 | 10–300 | 10–300 |
| YO$_2$/W$_2$O$_3$ | 5–100 | 10–60 | 10–40 | wherein R is propyl, W is aluminum and Y is silicon maintaining the mixture until crystals of the zeolite are formed. Thereafter the crystals are separated from the liquid and recovered. Typical reaction conditions consist of heating the foregoing reaction mixture to a temperature of from about 75° to 175°C for a period of time of from about 6 hours to 60 days. A more preferred temperature range is from about 90° to 150°C. with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the appropriate oxide. Such compositions include for an aluminosilicate, sodium aluminate, alumina, sodium silicate, silica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of soidum hydroxide, or by an aqueous solution of sodium silicate tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, in terms of mole ratios of oxides (water-free) as follows:

$$0.9 \pm 0.2 \; M_2O : Al_2O_3 : x \; SiO_2$$

wherein M is at least one cation, n is the valence thereof and x is greater than 5. In a preferred synthesized form, the zeolite has a formula, in terms of mole ratios of oxides (water-free), as follows:

$$0.9 \pm 0.2 \; M_2O : Al_2O_3 : \mathbf{10\text{-}60} \; SiO_2$$

and M is selected from the group consisting of a mixture of alkali metal cations, especially sodium, and tetraethylammonia cations.

ZSM-8 possesses a definite distinguishing crystalline structure having the following X-ray diffraction pattern:

TABLE 4

| dA | I/I₀ | I/I₀ | dA |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U.S. Pat. Nos. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range $SiO_2/Al_2O_3$ — from about 10 to about 200

$Na_2O$/tetraethylammonium hydroxide — from about 0.05 to .020

Tetraethylammonium hydroxide/$SiO_2$ — from about 0.08 to 1.0

$H_2O$/tetraethylammonium hydroxide — from about 80 to about 200

Thereafter, the crystals are separated from the liquid and recovered. Typical reaction conditions consist of maintaining the foregoing reaction mixture at a temperature of from about 100° to 175°C. for a period of time of from about 6 hours to 60 days. A more preferred temperature range is from about 150° to 175°C. with the amount of time at a temperature in such range being from about 12 hours to 8 days.

The ZSM-5 type zeolites used in the instant invention usually have the original cations associated therewith replaced by a wide variety of other cations according to techniques well known in the art. Typical replacing cations would include hydrogen, ammonium and metal cations including mixtures of the same. Of the replacing cations, particular preference is given to cations of hydrogen, ammonium, rare earth, magnesium, zinc, calcium, nickel, and mixtures thereof.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolites may be washed with water and dried at a temperature ranging from 150° to about 600°F. and thereafter heated in air or other, inert gas at temperatures ranging from about 500°F. to 1500°F. for periods of time ranging from 1 to 48 hours or more.

It is also possible to treat the zeolite with steam at elevated temperatures ranging from 800° to 1600°F. and preferably 1,000°F. and 1,500°F, if such is desired. The treatment may be accomplished in atmospheres consisting partially or entirely of steam.

A similar treatment can be accomplished at lower temperatures and elevated pressures, e.g. 350°–700°F. at 10 to about 200 atmospheres.

A preferred embodiment of this invention resides in the use of a porous matrix together with the ZSM-5 type zeolite previously described. The ZSM-5 type zeolite can be combined, dispersed or otherwise intimately admixed with a porous matrix in such proportions that the resulting product contains from 1 to 95% by weight, and preferably from 10 to 50 percent by weight, of the zeolite in the final composite.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatemaceous earths, and inorganic oxides. Inorganic compositions especially those of a siliceous nature are preferred. Of these matrices, inorganic oxides such as clay, chemically treated clay, silica, silica-alumina, etc., are particularly preferred because of their superior porosity, attrition resistance, and stability.

The compositing of the aluminosilicate with an inorganic oxide can be achieved by several methods wherein the aluminosilicates are reduced to a particle size less than 40 microns, preferably less than 10 microns, and intimately admixed with an inorganic oxide while the latter is in a hydrous state such as in the form of hydrosol, hydrogel, wet gelatinous precipitate, or in a dried state, or a mixture thereof. Thus, finely divided aluminosilicates can be mixed directly with a siliceous gel formed by hydrolyzing a basic solution of alkali metal silicate with an acid such as hydrochloric, sulfuric, acetic, etc. The mixing of the three components can be accomplished in any desired manner, such as in a ball mill or other types of mills. The aluminosilicates also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain speroidally shaped "bead" particles of catalyst such as described in U.S. Pat. No. 2,384,946. The aluminosilicate siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example, by adding ammonium hydroxide, ammonium carbonate, etc. to a salt of aluminum, such aluminum chloride, aluminum sulfate, aluminum nitrate, etc., in an amount sufficient to form aluminum hydroxide which, upon drying, is converted to alumina. The aluminosilicate may be incorporated with the aluminiforous oxide while the latter is in the form of hydrosol, hydrogel, or wet gelatinous precipitate of hydrous oxide, or in the dried state.

The catalytically inorganic oxide matrix may also consist of a plural gel comprising a predominant amount of silica with one or more metals or oxides thereof selected from Groups IB, II, III, IV, V, VI, VII, and VIII of the Periodic Table. Particular preference is given to plural gels or silica with metal oxides of Groups IIA, III and IVa of the Periodic Table, especially wherein the metal oxide is rare earth oxide, magnesia, alumina, zirconia, titania, beryllia, thoria, or combination thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent.

The inorganic oxide may also consist of raw clay or a clay mineral which has been treated with an acid medium to render it active. The aluminosilicate can be incorporated into the clay simply by blending the two and fashioning the mixture into desired shapes. Suitable clays include attapulgite, kaolin, seipiolite, polygarskite, kaolinite, halloysite, plastic ball clays, bentonite, montmorillonite, illite, chlorite, etc.

Other useful matrices include powders of refractory oxides, such as alumina, alpha alumina, etc., having very low internal pore volume. Preferably, these materials have substantially no inherent catalytic activity of their own.

The catalyst product can be heated in steam or in other atmospheres, e.g., air, near the temperature contemplated for conversion but may be heated to operating temperatures initially during use in the conversion process. Generally, the catalyst is dried between 150°F. and 600°F. and thereafter may be calcined in air, steam, nitrogen, helium, flue gas or other gases not harmful to the catalyst product at temperatures ranging from about 500°F. to 1600°F. for periods of time ranging from 1 to 48 hours or more. It is to be understood that the aluminosilicate can also be calcined prior to incorporation into the inorganic oxide gel. It is also to be understood that the aluminosilicate or aluminosilicates need not be ion exchanged prior to incorporation in a matrix but can be so treated during or after incorporation into the matrix.

As has previously been stated, it is also possible to have a hydrogenation/dehydrogenation component present in the catalyst composition.

The amount of the hydrogenation/dehydrogenation component employed is not narrowly critical and can range from about 0.01 to about 10 weight percent based on the entire catalyst. A variety of hydrogenation components may be combined with either the ZSM-5 type zeolite and/or matrix in any feasible manner which affords intimate contact of the components, employing well known techniques such as base exchange, impregnation, coprecipitation, cogellation, mechanical admixture of one component with the other, and the like. The hydrogenation component can include metals, oxides, and sulfides of metals of the Periodic Table which fall in Group VIB including chromium, molybdenum, tungsten and the like; Group IIB including zinc cadmium; and Group VIII including cobalt, nickel, platinum, palladium, rhenium, rhodium and the like and combinations of metals, sulfides and oxides of metals of Group VIB and VIII, such as nickel-tungsten-sulfide, cobalt oxide-molybdenum oxide and the like.

The pre-treatment before use varies depending on the hydrogenation component present. For example, with components such as nickel-tungsten and cobalt molybdenum, the catalyst is sulfur activated. But with metals like platinum or palladium, a hydrogenation step is employed. These techniques are well known in the art and are accomplished in a conventional manner.

Within the above description of the ZSM-5 type zeolites which can be used alone or physically admixed in a porous matrix, it has been found that certain aluminosilicates provide superior results when employed in the process of this invention.

First of all, it is preferred that there be a limited amount of alkali metal cations associated with the aluminosilicates since the presence of alkali metals tends to suppress or limit catalytic properties, the activity of which as a general rule decreases with increasing content of alkali metal cations. Therefore, it is preferred that the aluminosilicates contain no more than 0.25 equivalents per gram atom of aluminum and more preferably no more than 0.15 equivalents per gram atom of aluminum of alkali metal cations.

With regard to the metal cations associated with the ZSM-5 type aluminosilicate, the general order of preference is first cations of trivalent metals, followed by cations of divalent metals, with the least preferred being cations of monovalent metals. Of the trivalent metal cations, the most preferred are rare earth metal cations, either individually or as a mixture of rare earth metal cations.

However, it is particularly preferred to have at least some protons or proton precursors associated with the aluminosilicate via exchange with ammonium compounds or acids.

The selective conversion catalyst for low boiling normal paraffins and comprising up to $C_6$ normal paraffins referred to herein as a small pore erionite type of catalyst is a porous solid particle material having a majority of its pores of substantially uniform small dimension, large enough to allow uptake and egress of normal paraffin molecules such as, for example, normal hexane, but too small to allow a smaller uptake of either branched chain or cycle hydrocarbons such as, for example, methylpentane, cyclohexane or benzene. Accordingly, the selective catalytic material is a highly porous material wherein a substantial majority of its pores are of a uniform dimension in the range of about 4.5 to about 6.0 Angstrom units effective diameter. This catalyst is essentially a selective cracking catalyst substantially provided with inpore acid activity cracking sites and in-pore catalytically effective hydrogenation-dehydrogenation sites when used for hydrocracking. In some cases, one of the two functions of catalytic sites may be associated with the molecular shape selective material but externally located. The hydrogenation-dehydrogenation component or components introduced during manufacture of the catalyst involves one or more of the elements known as the transition metal. Preferably, one or more of the elements of nickel, cobalt, molybdenum, iron, or of the platinum or palladium family are employed. One or more of the elements employed may also involve an element of the higher molecular weight transition series which have hydrogenation-dehydrogenation activity, such as tungsten. The catalytically active solid material of the erionite type is a modified zeolite oxide, having a crystalline, rigid and uniform cavity structure of the above mentioned dimensions. Examples are to be found among a number of aluminosilicate minerals, and among synthetically prepared crystalline aluminosilicates which have structures analogous to and sometimes differing from minerals known to occur naturally, such as chabazite, gmelinite, stilbite, erionite, offretite, epistilbite, desmin, zeolites S, T, A, and others. These solids of desired porosity are modified to produce useful catalysts by introduction of one or more of the above described transition elements in such a way that a majority of the final quantity of such element is located in the internal porous structure, on the outside of the porous structure or both within and without the porous structure. Introduction of one or more of the metal components may be achieved either by processes allowing the component to penetrate the existing or preformed porous solid and be fixed therein, or by formation on synthesis of the porous solid itself in a compositional environment which contains the desired metallic component in a suitable form so as to be incorporated in the porous structure during formation of the porous solid or in the course of its modification to a desired pore structure.

As indicated above, the erionite catalyst is provided with a desired magnitude of acid catalytic activity. For example, erionite may be acid treated to remove initial cations and impurities and thereafter be base-exchanged with a solution of calcium ion or magnesium ion or a mixture thereof until most of the cation exchange capacity of the zeolite is satisfied by that ion. The transition metal ion may be introduced simultaneously, or by a subsequent exchange process. A more exacting control of the catalyst quality may be achieved by exchange of the zeolite simultaneously with a solution comprising at least one of the ions of each of the two groups comprising in the first group $Mg^{2+}$, $Ca^{2+}$, $Sr^{2+}$, and in the second group $H^+$ and $NH_4^+$, in such proportion as to result in an ultimate product of desired acidity. One suitable method for preparing the erionite type catalyst herein described for hydrocracking activity is as follows:

A natural crystalline aluminosilicate identified as erionite obtained from Nevada was analyzed with the following results:

| | Weight Percent |
|---|---|
| $SiO_2$ | 68.4 |
| $Al_2O_3$ | 16.2 |
| $Fe_2O_3$ | 2.7 |
| $K_2O$ | 4.4 |
| $CaO$ | 2.0 |
| $Na_2O$ | 4.7 |
| $MgO$ | 1.3 |
| Silica to alumina mol ratio | 7.2 |

A sample of the above identified erionite was crushed to provide a powder. The power was exchanged twice with 6 ml of 5 M ammonium chloride solution per gram (bone dry basis) of the erionite powder for 4 hours at 180°F. with filtering after each exchange. Thereafter the exchanged erionite is washed with 10 ml of water per gram of erionite and filtered. Then the erionite zeolite is exchanged with 4.4 ml of 0.5 M nickel acetate solution (adjusted to 6 pH with acetic acid) per gram of the zeolite for 4 hours at 210°F. and filtered. The nickel exchanged zeolite is then washed with 10 ml of water per gram of zeolite and filtered. The exchanged zeolite prepared as above identified is then dried for at least 16 hours or to a constant weight at a temperature in the range of 225° to 250°F. The dried erionite zeolite promoted with nickel is then pelleted.

The present invention is concerned with contacting a relatively wide boiling range naphtha fraction known as a full boiling range fraction which boils in the range of $C_5$ hydrocarbons up to about 380° or 400°F. and thereafter effecting a selective conversion of paraffin constituents existing in the reformate product under conditions suitable for particularly removing low octane relatively low boiling $C_6+$ lower boiling paraffins while retaining low boiling high octane singly branched paraffins in the front end to improve the volatility of the reformate product of the process.

DESCRIPTION OF SPECIFIC EMBODIMENTS

The table below provides data for comparing the different operating combinations comprising reforming alone and in combination with SC1 (ZSM-5 type catalytic cracking) and SC2 (erionite type catalytic cracking operations). The selective cracking operations are effected in the presence of hydrogen and preferably are selective hydrocracking operations as defined hereinbefore.

Figure 1:
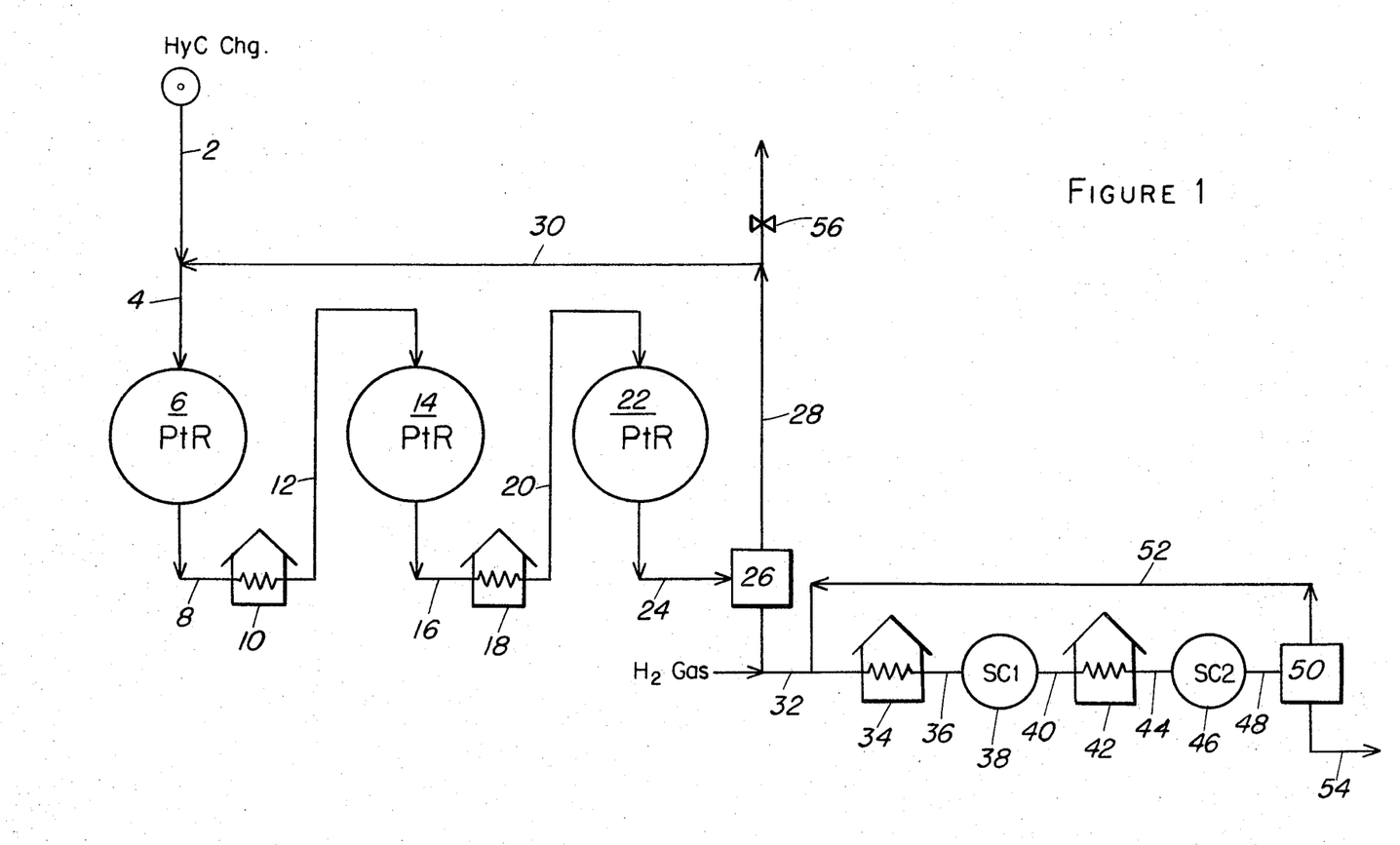
FIG. 1 diagrammatically presents one processing arrangement representing a reforming operation followed by two sequential selective cracking zones.

The first three columns of data in the table show sequentially what is going on for example in the combination of platinum reforming followed by SC1 cracking and then SC2 cracking. The first column identifies the gasoline composition at the end of the platinum reforming (PtR) section of the combined system. It also identifies the feed passed to the SC1 selective cracking step using a ZSM-5 type of catalyst. The second column identifies the product composition obtained after such conversion over the SC1 catalyst. The second column also identifies the feed passed over the final selective cracking stage SC2. The third column identifies the product composition obtained from the second selective conversion stage SC2. Thus the third column presents the product composition obtained from a combination operation such as represented by FIG. 1.

The fourth column of the table identifies the product obtained from a platinum reforming operation pushed by operating conditions to provide a naphtha product having a 103.9 $C_5+$ leaded octane rating for comparison with the product of the combination process presented in column 3.

The fifth column is provided to identify the final product composition for the combination of platinum reforming plus selective cracking (SC1) over the ZSM-5 type catalyst run to the same operating severity ($C_5+$ leaded octane of 103.9) as obtained by the product identified in column 3. Thus column 5 identifies the composition that would result if the partially converted material identified in column 2 were move severely processed over the ZSM-5 type catalyst so as to produce a $C_5+$ leaded octane product of 103.9.

TABLE

| Product Yields, Based on Charge (Wt %) | (1) PtR Interface | (2) PtR+SC1 −Interface | (3) PtR+SC1+SC2 | (4) PtR | (5) PtR+SC1 |
|---|---|---|---|---|---|
| Hydrogen | 1.52 | 1.48 | 1.3 | 1.71 | 1.31 |
| Methane | 1.22 | 1.34 | 1.8 | 1.97 | 1.38 |
| Ethane | 2.43 | 2.81 | 3.5 | 4.08 | 3.33 |
| Propane | 3.86 | 8.07 | 13.3 | 6.88 | 10.55 |
| Isobutane | 2.13 | 4.69 | 4.8 | 5.85 | 5.39 |
| Normal Butane | 2.71 | 5.32 | 2.9 | 3.81 | 6.01 |
| Isopentane | 3.85 | 5.04 | 5.1 | 6.76 | 5.35 |
| Normal Pentane | 2.66 | 2.91 | 1.2 | 2.83 | 2.56 |
| Dimethyl Butanes | 2.45 | 2.44 | 2.44 | 2.47 | 2.26 |
| Monomethyl Pentanes | 9.42 | 8.37 | 8.37 | 6.58 | 8.00 |
| Normal Hexane | 5.81 | 2.24 | 0.30 | 3.60 | 1.33 |
| Benzene | 3.33 | 3.69 | 3.69 | 3.45 | 4.06 |
| Dimethyl Pentanes | 2.32 | 2.10 | 2.10 | 0.96 | 2.14 |
| Monomethyl Hexanes | 6.71 | 3.84 | 3.84 | 2.37 | 3.12 |
| Normal Heptane | 2.75 | 0.33 | 0.0 | 0.89 | 0.12 |
| Toluene | 9.95 | 11.13 | 11.13 | 12.52 | 11.65 |
| Iso-$C_8$ Paraffins | 4.27 | 2.70 | 2.70 | 0.80 | 2.33 |
| Normal $C_8$ Paraffins | 0.91 | 0 | 0.0 | 0.07 | 0 |
| $C_9+$ Paraffins | 1.60 | 0.54 | 0.54 | 0.0 | 0.46 |
| $C_8+$ Aromatics | 28.37 | 28.79 | 28.80 | 31.95 | 26.92 |
| $C_5+$ Naphthenes | 1.73 | 2.17 | 2.17 | 0.46 | 1.73 |
| Total | 100.0 | 100.0 | 100.0 | 100.0 | 100.0 |
| Yields on Charge | | | | | |
| $C_5+$ Wt % | 86.1 | 76.3 | 72.4 | 75.7 | 72.0 |
| $C_5+$ Vol % | 82.1 | 71.6 | 67.3 | 70.3 | 67.0 |
| $C_6+$ Wt % | 79.6 | 68.4 | 66.1 | 66.1 | 64.1 |
| $C_6+$ Vol % | 74.6 | 62.4 | 59.9 | 59.2 | 57.9 |
| Product Properties | | | | | |
| $C_5+$ R+3 Octane | 97.6 | 102.4 | 103.9 | 103.9 | 103.9 |
| $C_5+$ R+O do. | 87.8 | 96.0 | 98.7 | 98.3 | 98.3 |
| $C_5+$ ASTM 50%, °F | — | 224 | 232 | 233 | 226 |
| $C_5+$ R+O FEON | 62.2 | 73.9 | 79.2 | 72.2 | 77.2 |
| $C_5+$ R+3 FEON | 84.8 | 91.7 | 94.8 | 90.6 | 93.6 |

FEON (front end octane number)
Charge stock — $C_6$−330°F Kuwait naphtha.

OBSERVATIONS FROM THE TABLED DATA

The selective cracking section SC1 of the combined system shows improving the $C_5+$ leaded octane number from 97.6 (col. 1) to 102.4 (col. 2) by cracking out normal and monomethyl paraffins. In this cracking step only slightly more methane and ethane is produced but significantly more propane, butanes and isopentane. Normal pentanes increase slightly (cols. 1 and 2). Front end octane number (FEON) is increased considerably since low octane paraffins in the front end are being removed. The SC2 section of the combined operation boosts $C_5$ plus leaded octane number from 102.4 to 103.9 (cols. 2 and 3) by removing the low octane normal pentanes and hexane. These paraffins are converted primarily to propane, though some methane and ethane are produced. Normal butane is also cracked in this section (SC2) as evidenced by comparison of cols. 2 and 3. Front end octane is significantly improved by this section (from 91.7 to 94.8 $C_5+$ leaded) primarily due to the removal of normal pentane and hexane that reduces front end octane rating.

Comparing the dual selective cracking operation product slate presented in column 3 with that of platinum reforming alone (col. 4) and platinum reforming plus SC1 selective cracking (col. 5) at the same severity of 103.9 $C_5$ plus leaded octane, it will be observed that the dual selective conversion operation (col. 3) produces more propane than either reforming alone (col. 4) or reforming plus SC1 cracking (col. 5). The production of increased yields of propane and less butanes can be very advantageous in some environments. It also is to be noted that $C_5$ plus yields are offset by front end octane improvement. The reforming, SC1 and SC2 combination product (col. 3) is also observed to contain less aromatics than the product of reforming alone but more than that obtained by the combination of reforming plus SC1 cracking (col. 5). The $C_5$ plus front end leaded octane is significantly higher for the combination (reforming + SC1 + SC2) than for the other operations identifiable with cols. 4 and 5. The product volatilities (on a $C_5$ plus basis) do not appear significantly different.

Having thus provided a general discussion of the improved method and processing combination of this invention and presented examples in support thereof, reference is now had to the drawings by way of example for a discussion on particular processing arrangements one might employ to practice the method and concepts of this invention.

Referring now by way of example to FIG. 1, a hydrocarbon charge comprising a full boiling naphtha boiling from about $C_5$ hydrocarbons up to about 380° or 400°F. is introduced to the process by conduit 2 admixed with hydrogen-rich recycle gas obtained, as more fully discussed hereinafter, to form a hydrogen-hydrocarbon mixture in suitable proportions for passage by conduit 4 to an initial platinum catalyst reforming reactor 6. It is to be understood that the mixture in conduit 4 is passed through a suitable preheating step to raise the temperature of the mixture sufficient to accomplish dehydrogenation of naphthenes in a naphtha charge to form aromatics during contact with the platinum reforming catalyst in reactor 6. The reforming catalyst employed in reactor 6 is of a composition particularly suitable for effecting primarily dehydrogenation of naphthenes to form aromatics in a major proportion prior to passing the hydrocarbon reactants with hydrogen to the next reactor containing a platinum reforming catalyst. Of course some cyclization, isomerization and even hydrocracking will be experienced during the dehydrogenation reaction. The catalyst employed in the first reactor may or may not contain significant amounts of halogen as desired and in those situations utilizing a bimetallic catalyst halogen complexed therewith can be used to advantage. The products of reaction and unreacted hydrocarbon charge and hydrogen material is passed from reactor 6 by conduit 8 to a suitable furnace 10 wherein the mixture is again raised to reforming temperatures suitable for use in the second stage of the reforming operation. The mixture thus reheated in furnace 10 is thereafter passed by conduit 12 in contact with platinum reforming catalyst maintained in reactor 14. In reactor 14 the dehydrogenation of naphthenes is further effected in conjunction with effecting some cyclization, isomerization and hydrocracking of paraffinic constituents existing in the hydrocarbon material passed thereto. The effluent material of reactor 14 is conveyed by conduit 16 to heater 18 and thereafter passed by conduit 20 to platinum reforming reactor 22. In reactor 22 further reforming reactions are effected including dehydrogenation, hydrocracking, isomerization and cyclization reactions. The reformate product thus produced in the combination of reforming reactors 6, 14 and 22 is passed by conduit 24 to an initial high pressure separator 26, wherein hydrogen rich gaseous material is separated from higher boiling product material comprising normal liquid reformate product material. Although only one separator 26 is shown, it is to be understood that a lower pressure separation stage may also be employed in conjunction with the higher pressure separation step above defined in order to effect the recovery of low boiling hydrocarbons including hydrogen from the reformate product. In any event, a hydrogen rich gaseous material is recovered from the effluent of the multi-stage reforming operation and the recovered hydrogen rich gas stream is removed from separator 26 by conduit 28 and recycled to the reforming process by way of conduit 30. Under some circumstances, a portion of the hydrogen rich gas in conduit 28 may be bled from the system for use in other processes by way of conduit 56 provided with a suitable shut-off valve. The normal liquid product separated in separator 26 is removed therefrom and passed by conduit 32 to heater 34 wherein its temperature is raised before passage to the next succeeding catalyst contact step. Hydrogen rich gas may be admixed with the liquid hydrocarbon effluent material or reformate in conduit 32 or it may be combined therewith after adjusting the temperature of the reformate in conduit 32. In any event, the liquid effluent admixed with hydrogen containing gas and at a temperature in the range of 500° to 800°F. and a pressure in excess of 200 psig is thereafter passed by conduit 36 to reactor 38 comprising a ZSM-5 type of conversion catalyst hereinbefore described. In reactor 38 selective hydrocracking (SC1) of normal and single branched paraffins boiling above $C_6$ paraffins is practiced without effecting significant cracking of $C_5$ and some $C_6$ hydrocarbons. It is to be understood that aromatics and double branched paraffinic constituents are desirably retained and thus the hydrocracking conditions are selected to preserve this end. The total effluent of reactor 38 is thereafter conveyed by conduit 40 to furnace 42 for the purpose of heating the charge to a temperature generally higher than about 700°F. to be employed in reactor 46. The reactant materials thus heated in furnace 42 are passed by conduit 44 to reactor 46 wherein a selective removal by hydrocracking of undesired low boiling normal paraffinic constituents, and particularly $C_5$ and $C_6$ normal paraffins, are removed from the hydrocarbon mixture passed thereto by use of a catalyst particularly selective for this purpose. The hydrocarbon mixture treated in reactor 46 as by selective hydrocracking (SC2) over an erionite type of hydrocracking catalyst is thereafter passed by conduit 48 to a separator 50 wherein hydrogen-rich gases and hydrocarbon constituents comprising dry gases are removed from a liquid hydrocarbon product stream comprising some absorbed low boiling hydrocarbons but primarily $C_6$ and higher boiling hydrocarbons. The separated hydrogen-rich gas may be recycled by conduit 52 for admixture with the hydrocarbon charge in conduit 32 or 36 as hereinbefore discussed. The product comprising primarily $C_6$ and higher boiling hydrocarbon constituents obtained by the combination of catalyst contact steps described is removed from separator 50 by conduit 54 as a high octane product of the process. The product thus recovered in conduit 54 comprises primarily relatively high octane constituents having an octane rating substantially in excess of 100 octane number and more usually in excess of 105 octane number. Moreover the distribution of these components are such as to give improved front end octane and higher volatility than reformate obtained by reforming alone.

Figure 2:
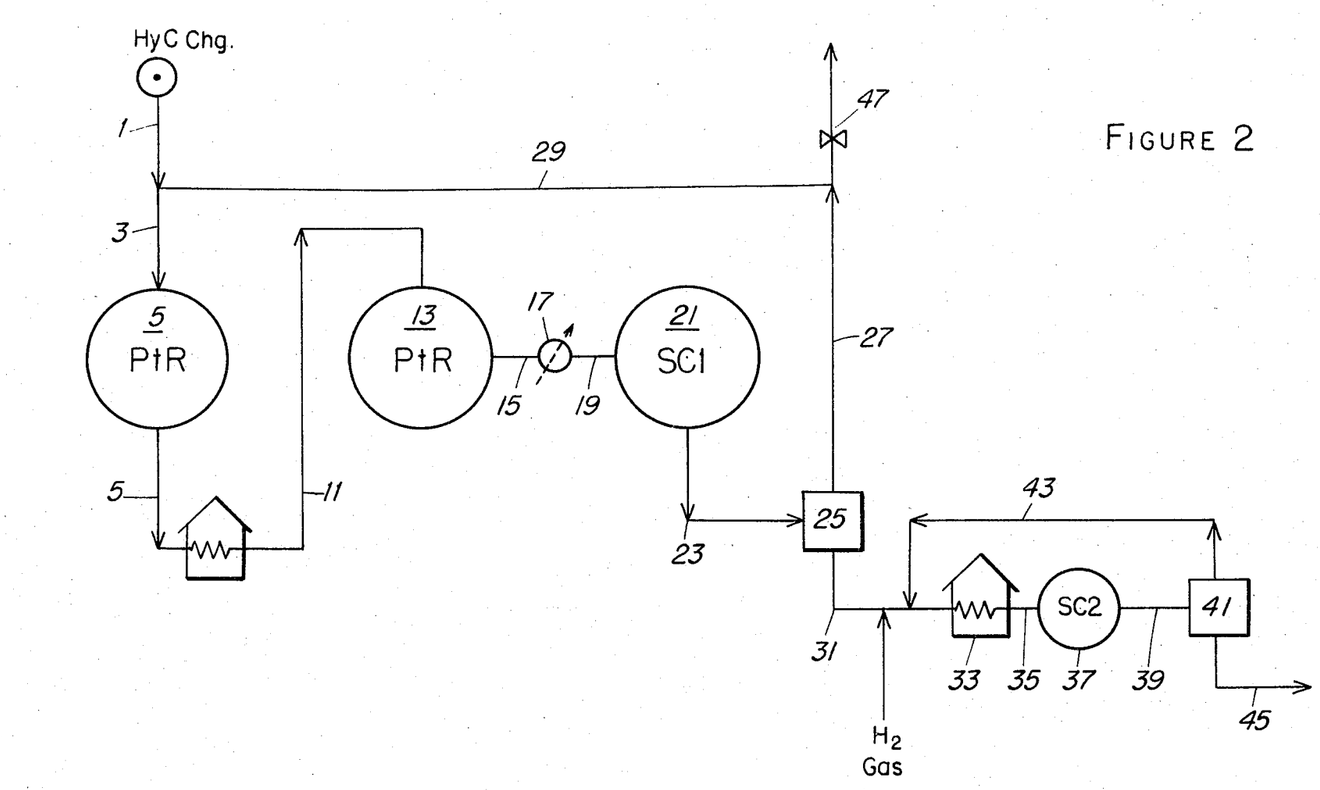
FIG. 2 diagrammatically presents a processing scheme wherein one of the reforming reactors is used to house the SC1 selective cracking catalyst in the processing combination of FIG. 1.

Referring now to FIG. 2 by way of example, there is shown a processing arrangement which departs from that described in FIG. 1 by using the third platinum catalyst reforming reactor to house the ZSM-5 type of conversion catalyst for effecting the SC1 hydrocracking in conjunction with providing a cooler 17 rather than a heater for adjusting the temperature of the charge passed to the reactor containing the ZSM-5 type of catalyst. Furthermore, separation of hydrogen-rich gas is accomplished after contact with the ZSM-5 type of catalyst. Thus, in the processing arrangement of FIG. 2, a naphtha hydrocarbon charge boiling in the gasoline boiling range up to about 400°F. is introduced to the process by conduit 1 for admixture with hydrogen-rich recycle gas in conduit 29. The mixture thus formed is thereafter passed by conduit 3 to an initial reforming reactor 5 containing a platinum reforming catalyst. The platinum type reforming catalyst is maintained under temperature and pressure conditions and of a composition which will be particularly effective for converting naphthenes to aromatics in a substantial proportion comprising at least a major proportion. The product effluent thus produced in reactor 5 and being of a lower temperature because of endothermic reaction conditions encountered therein is conveyed by conduit 7 to furnace 9. In furnace 9 the hydrocarbon effluent comprising hydrogen is heated to a temperature suitable for use in the second stage of the platinum reforming operation. The heated charge is passed by conduit 11 to reactor 13 containing a suitable platinum reforming catalyst wherein dehydrogenation of naphthenes is further completed. Cyclization, isomerization and hydrocracking of hydrocarbons may also be effected in both reactors to some degree. The product effluent obtained by the reactions of reactor 13 is then passed by conduit 15 to cooler 17 wherein the hydrocarbon mixture is cooled to a temperature below about 700°F. and preferably to a temperature in the range of 500°F. to 650°F. The cooled hydrocarbon mixture comprising paraffin, aromatics and hydrogen is thereafter passed by conduit 19 to reactor 21 wherein the mixture is passed in contact with a ZSM-5 type of catalyst maintained under (SC1) hydrocracking conditions suitable to effect primarily cracking of high boiling normal paraffins and single branched paraffins. The hydrocarbon product of reactor 21 is thereafter conveyed by conduit 23 to separator 25 wherein a hydrogen containing gaseous material is separated from a liquid product stream and removed therefrom by conduit 27. $H_2$ rich gas may be recycled before or after removal of gaseous hydrocarbon by conduit 29 to the initial reforming reactor as hereinbefore discussed. A portion of the hydrogen-rich gas may be bled from the system by conduit 47 containing a suitable valve. The liquid product comprising primarily $C_5$ and higher boiling hydrocarbons separated in separator 25 is passed by conduit 31 to heater 33 and thence by conduit 35 to reactor 37. Hydrogen containing recycle gas in conduit 43 may be combined with the hydrocarbon mixture in conduit 31 or conduit 35, as desired. Additional hydrogen rich gas may be added to conduit 31 as shown since the erionite type catalyst is a hydrogen consumer. It is preferred that added hydrogen be combined with the hydrocarbon mixture in conduit 31 before passage to furnace 33. In furnace 33 the hydrocarbon mixture with hydrogen is heated to an elevated temperature above about 700°F., before passing the mixture in contact with a small pore (4–6 Angstrom pore size) selective conversion catalyst used in reactor 37. As discussed hereinbefore, the reaction conditions employed in reactor 37 may be made to vary over a considerably wide range depending upon the particular catalyst employed therein. The reaction mechanisms to be effected in reactor 37 are essentially those which will remove undesired low octane paraffin components such as $C_5$ and $C_6$ normal paraffins from desired higher octane aromatics and branched chain components. The catalyst employed in reactor 37 is preferably a pore size selective catalyst which excludes singly and multi-branched chain hydrocarbon from contacting the catalyst cracking and hydrogenation sites or the reaction conditions of hydrocracking will be selected to preclude undesired hydrocracking of retained branched hydrocarbons or hydrogenation of aromatic hydrocarbons while effecting hydrocracking of undesired low boiling normal paraffins. Thus, the reactions effected in reactor 37 are a clean-up stage for effecting the removal of low octane normal paraffin components from higher octane components. The product effluent of reactor 37 is thereafter passed by conduit 39 to separator 41. In separator 41 low boiling hydrocarbons including hydrogen are separated from a desired higher octane product effluent and recycled as desired by conduit 43. The separated higher octane constituents are removed from separator 41 by conduit 45. These constituents are thereafter passed to a gasoline pool for use therein as desired.

Figure 3:
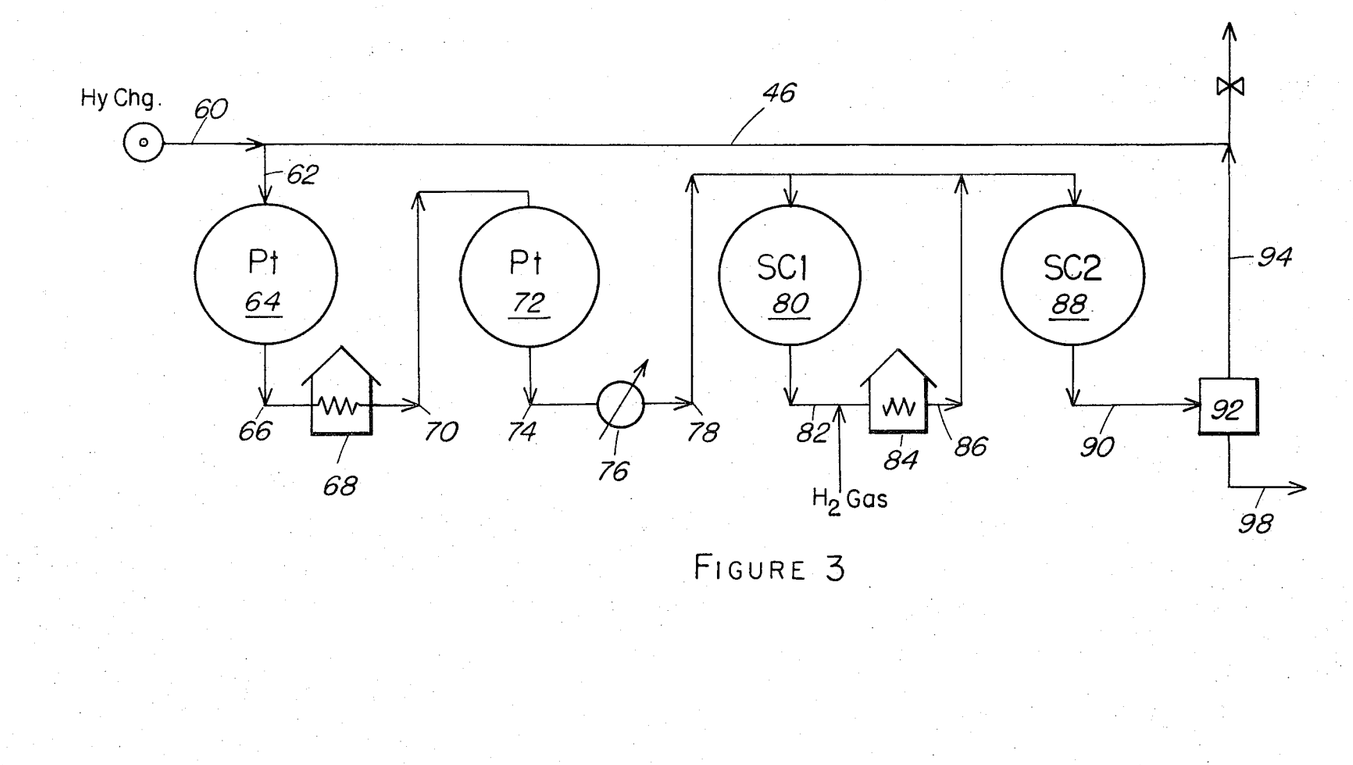
FIG. 3 diagrammatically presents a processing scheme wherein the hydrocarbon charge with hydrogen is caused to pass through the processing combination of reforming, SC1 and SC2 selective cracking operations without intermediate separation of product.

FIG. 3 presents a processing combination differing from FIGS. 1 and 2 primarily in the concept of passing the total effluent of each reaction zone to the next succeeding reaction zone under desired temperature conditions until the total effluent has passed through the combination of reaction zones comprising the different catalyst compositions herein described and thereafter the product effluent is separated to recover a hydrogen containing gaseous phase from a liquid product phase essentially free of normal $C_6$ and lower boiling hydrocarbons. In this combination a platinum reforming operation is maintained in at least the first two reaction zones; the third reaction zone houses a ZSM-5 type of catalyst and the fourth reaction zone houses a catalyst composition selective for removing by cracking the $C_6$ and lower boiling normal paraffins from higher octane components either on the basis of catalyst selectivity or operating conditions employed therein. In the arrangement of FIG. 3, a hydrocarbon charge such as a full boiling naphtha of gasoline boiling range is introduced to the process by conduit 60 for admixture with hydrogen-rich recycle gas in conduit 96. The mixture preheated to an elevated temperature sufficient to effect dehydrogenation of naphthenes and form aromatics as well as cyclization, isomerization, and hydrocracking reactions is passed by conduit 62 to an initial platinum reforming reactor 64. In reactor 64 dehydrogenation of naphthenes is accomplished substantially. The effluent of reactor 64 is passed by conduit 66 to heater 68. In heater 68 the charge is reheated to an elevated reforming temperature and thereafter passed by conduit 70 to a second platinum catalyst reforming step effected in reactor 72. In reactor 72, dehydrogenation of naphthenes, isomerization, cyclization and hydrocracking of paraffins is accomplished. The product effluent of reactor 72 is thereafter passed by conduit 74 to cooler 76 wherein the effluent is cooled to a temperature below 700°F. and suitable for passage of the effluent in contact with a ZSM-5 type of catalyst in reactor 80. In reactor 80, reaction conditions are maintained so that in the presence of a ZSM-5 type of catalyst the high boiling normal and single branched paraffins comprising the effluent in conduit 78 are converted by hydrocracking. The product effluent of reactor 80 is thereafter passed by conduit 82 to furnace 84 wherein the temperature of the effluent is raised to a temperature of at least 700°F. and suitable for effecting the selective hydrocracking of low octane normal paraffin constituents remaining in the effluent. The charge is passed from heater 84 by conduit 86 to reactor 88 wherein the charge encounters the restricted pore size crystalline zeolite hydrocracking catalyst which is selective for cracking low octane normal paraffins to the exclusion of converting other hydrocarbons present. As mentioned hereinbefore, the catalyst employed in reactor 88 is a selective catalyst having an average pore size of about 5 Angstroms. The effluent of reactor 88 is then passed by conduit 90 to separator 92. In separator 92 hydrogen-rich gaseous material is separated from a product stream comprising $C_6$ and higher boiling hydrocarbons. The $C_6$ and higher boiling hydrocarbons are removed from separator 92 by conduit 98. The hydrogen-rich gaseous material is removed from separator 92 by conduit 94 and all or a portion of hydrogen rich gases in conduit 94 may be recycled to the initial platinum reforming step by conduit 96.

It is to be understood that in the processing combination of this invention specifically described in connection with FIGS. 1, 2 and 3, a fractionator may be employed following the separator of the reforming operation to optimize the boiling range of the charge passed over the ZSM-5 and erionite catalyst. Also treatment of hydrogen-rich gaseous material separated in the process to remove undesired hydrocarbon constituents therefrom may be effected before recycling for example to the platinum reforming operation. It is known at this stage of the art that in reforming operations it is important to exercise control on the level of moisture and chloride encountered in the reforming operation and such controls are a part of processing steps of this invention. Thus, alternatives may be employed in the general processing schemes described to take care of these requirements. It is also to be understood that where appropriate the (SC1) ZSM-5 type of catalyst and the (SC2) selective hydrocracking catalyst employed downstream thereof may be used for example in sequential catalyst beds in a single third reactor of a reforming operation. For example, the ZSM-5 catalyst and the erionite hydrocracking catalyst may be employed in the third reactor of a platinum reforming operation. It is further contemplated employing the third reactor of a reforming operation to house a small amount of platinum catalyst in an upper part thereof, a ZSM-5 catalyst in an intermediate portion and the erionite selective conversion catalyst in a lower portion of the reactor. It will be understood, of course, that the processing economics will be greatly influenced depending upon the particular relationship utilized. Furthermore, the product obtained may be made to vary considerably depending upon reaction conditions and this will be influenced by the process combination employed as well as by the type of hydrocarbon charge introduced to the process. However, these variations do not detract from the novel concepts herein expressed or the processing combinations contemplated by this invention.

Having thus provided a discussion of the method and concepts comprising this invention, and specifically described particular processing arrangements or combinations which may be employed in support thereof, it is to be understood that no undue restrictions are to be imposed by reason of the specific examples described except as defined by the appended claims.

We claim:

1. A method for upgrading a naphtha charge composition boiling in the gasoline boiling range which comprises:

reforming a naphtha charge with a platinum reforming catalyst maintained at reforming conditions including a temperature above 800°F. and a pressure below 700 psig to produce an aromatic enriched product effluent comprising normal and branched hydrocarbons, passing aromatic enriched product of said reforming in contact with a ZSM-5 type of crystalline aluminosilicate zeolite catalyst composition provided with major axis elliptical pore size in the range of about 6 to about 9 Angstroms under conditions for selectively cracking singly branched and normal hydrocarbons comprising $C_7$ and higher boiling hydrocarbons, and thereafter subjecting the product of the above selective cracking to contact with a crystalline aluminosilicate zeolite hydrocracking catalyst of the erionite type providing an average pore size less than about 6 Angstroms under temperature and pressure conditions selected to crack n-paraffins boiling below $C_7$ hydrocarbons without substantial cracking of multibranched hydrocarbons and $C_7$ to $C_9$ alkyl aromatics in the aromatic enriched product.

2. The method of claim 1 wherein the aromatic enriched product of reforming contains hydrogen produced during said reforming and the ratio of $H_2$ to hydrocarbon passed in contact with said ZSM-5 type crystalline zeolite cracking catalyst is effective for converting singly branched paraffins.

3. The method of claim 1 wherein the aromatic enriched product of said reforming step is separated to recover hydrogen rich gaseous material from higher boiling reformate product before selective cracking of said higher boiling reformate product and separated hydrogen rich gaseous material is recycled to said reforming step.

4. The method of claim 1 wherein the total product effluent of said reforming is passed in contact with said ZSM-5 type of crystalline zeolite cracking catalyst, the effluent thereof is separated into a hydrogen rich gaseous fraction and a higher boiling product fraction comprising $C_5$ hydrocarbons and $C_7$ to $C_9$ alkyl aromatics, the higher boiling fraction is passed with hydrogen in contact with said erionite hydrocracking catalyst and separated hydrogen rich gases are recycled to said reforming step.

5. The method of claim 1 wherein the total product effluent of said reforming is sequentially passed to said ZSM-5 type zeolite cracking step and thence to the erionite catalyst contact steps.

6. A method for upgrading a naphtha charge fraction comprising $C_5$ and higher boiling hydrocarbons which comprises:

reforming a naphtha charge in at least two sequentially arranged beds of platinum reforming catalyst under conditions to produce an aromatic rich reformate product comprising $C_5$ and higher boiling normal and singly branched hydrocarbons, selectively cracking normal and singly branched hydrocarbons higher boiling than $C_6$ hydrocarbons in said reformate product by contact with a cracking catalyst comprising a ZSM-5 type of crystalline zeolite, and thereafter selectively cracking $C_5$ and $C_6$ normal paraffins in the product of the ZSM-5 cracking operation with an erionite hydrocracking catalyst.

7. The method of claim 6 wherein a $C_5$+ hydrocarbon fraction is added to the aromatic rich reformate product of the reforming operation in an amount sufficient to effect partial cooling of the effluent.

8. A method for upgrading a naphtha boiling in the gasoline boiling range which comprises:

reforming a naphtha charge comprising paraffins and naphthenes over a platinum reforming catalyst under conditions to effect dehydrogenation of at least a major portion of the naphthenes in said naphtha charge, adjusting the product effluent of said reforming operation to a temperature in the range of 500° to 700°F. and passing the temperature adjusted effluent in contact with a ZSM-5 type crystalline zeolite catalyst under conditions of pressure and temperature to effect cracking of $C_6$ and higher boiling normal and singly branched paraffins to produce a product enriched in branched and aromatic hydrocarbons, separating the product thus enriched to recover a hydrogen rich gaseous stream from a hydrocarbon stream comprising $C_5$ and higher boiling hydrocarbons, and hydrocracking substantially only normal $C_5$ hydrocarbons in the hydrocarbon stream comprising $C_5$ and higher boiling hydrocarbons to lower boiling hydrocarbon components with an erionite crystalline zeolite catalyst provided with hydrogenation activity.

* * * * *